(12) United States Patent
Liao et al.

(10) Patent No.: US 8,690,001 B1
(45) Date of Patent: Apr. 8, 2014

(54) DRAIN PAN

(71) Applicants: Ying-Chieh Liao, Taichung (TW);
Yu-Kuo Liao, Taichung (TW)

(72) Inventors: Ying-Chieh Liao, Taichung (TW);
Yu-Kuo Liao, Taichung (TW)

( * ) Notice: Subject to any disclaimer, the term of this patent is extended or adjusted under 35 U.S.C. 154(b) by 0 days.

(21) Appl. No.: 13/792,020

(22) Filed: Mar. 9, 2013

(51) Int. Cl.
*B65D 1/36* (2006.01)

(52) U.S. Cl.
USPC .......................................... 220/573; 220/504

(58) Field of Classification Search
USPC ............... 220/483, 503–505, 571, 571.1, 573
See application file for complete search history.

(56) References Cited

U.S. PATENT DOCUMENTS

| | | | | |
|---|---|---|---|---|
| 534,957 | A | * | 2/1895 | Ingraham ........................ 220/62 |
| 4,394,853 | A | * | 7/1983 | Lopez-Crevillen et al. .. 123/195 C |
| 4,576,301 | A | * | 3/1986 | Tedder .......................... 220/571 |
| 4,770,276 | A | * | 9/1988 | Takubo ......................... 184/106 |
| 4,848,293 | A | * | 7/1989 | Sasada et al. ............. 123/195 C |
| 5,503,294 | A | * | 4/1996 | Taylor et al. .................. 220/571 |
| 5,655,624 | A | * | 8/1997 | Kelly, Jr. ........................ 184/1.5 |
| 6,454,121 | B1 | * | 9/2002 | Kurtz et al. .................... 220/573 |
| D587,421 | S | * | 2/2009 | Liao ................................ D34/27 |
| 7,673,658 | B1 | * | 3/2010 | Brewer et al. .................... 141/86 |
| D637,636 | S | * | 5/2011 | Liao ............................ D15/150 |
| D661,328 | S | * | 6/2012 | Liao ............................ D15/152 |
| D674,732 | S | * | 1/2013 | Gladwin ..................... D12/184 |
| D685,830 | S | * | 7/2013 | Lai ............................. D15/150 |
| 2011/0220658 | A1 | * | 9/2011 | Andrews ....................... 220/573 |

\* cited by examiner

*Primary Examiner* — J. Gregory Pickett
*Assistant Examiner* — Ned A Walker

(57) ABSTRACT

A drain pan for vehicle axle is adapted for being positioned to a circular margin of a hub. The drain pan includes a front wall, a rear wall, a bottom connecting the front wall and the rear wall therebetween, two lateral walls connecting the front wall and the rear wall therebetween, two cambered walls connecting the bottom and the lateral walls therebetween, and at least one magnetic member. The magnetic member is disposed on an outer surface of the one of the cambered walls. Each cambered wall and the magnetic member contact the circular margin of the hub for positioning the drain pan onto the circular margin by magnetic force. Thereby, the drain pan can be positioned quickly, and the drain pan is able to be utilized on hubs in various sizes.

5 Claims, 7 Drawing Sheets

DRAIN PAN

BACKGROUND OF THE INVENTION

1. Field of the Invention

The present invention relates to a drain pan for vehicle axle.

2. Description of the Prior Art

Generally speaking, big vehicles such as buses, trucks, trailers especially need regular maintenance. One of the most important processes of maintenance is replacement of lubricant oil of hub.

Differently from normal cars, liquid lubricant oil having lower viscosity is usually used on trucks. When the lubricant oil is to be replaced, the cover of hub has to be removed in advance to allow original lubricant oil to drain out. However, normal containers are difficult to be placed under the hub for collecting the lubricant oil. Thus, a drain pan having a shape corresponding to the circular margin of the hub is provided in some prior art. However, the drain pan placed on the circular margin may be moved easily and possibly fall from the circular margin, and it is troublesome to cleaning the leaking lubricant oil.

To solve the previous problem, the publication US 2011/0220658 disclosed a drain pan having positioning mechanism. The drain pan forms a plurality of positioning holes arranged circularly. Bolts or other positioning elements are inserted through the positioning holes and are positioned to the hub so that the drain pan is prevented from being moved. However, the process of positioning is too complicated and time-consuming. Specifically, before lubricant oil replacement, the bolts have to be positioned one by one. After collection of lubricant oil, the bolts must be removed one by one to allow the drain pan to be removed.

SUMMARY OF THE INVENTION

The main object of the present invention is to provide a drain pan for vehicle axle which is easy to be positioned to a hub and is prevented from being overturned.

To achieve the above and other objects, a drain pan for vehicle axle of the present invention adapted for being positioned to a circular margin of a hub includes a front wall, a rear wall, a bottom, two cambered walls, and at least one magnetic member.

The front wall has an upper margin and a lower edge, and the rear wall has an upper arc margin and a lower edge. The upper arc margin of the rear wall has an intermediate portion lower than two ends thereof. Each lateral wall connects the front wall and the rear wall therebetween. The bottom connects the lower edge of the front wall and the lower edge of the rear wall therebetween. Each cambered face connects the bottom and one of the lateral walls therebetween. A receiving room is defined and enclosed by the front wall, the rear wall, the two lateral walls, the bottom, and the two cambered walls. Each cambered wall is protruded away from the receiving room. The magnetic member is disposed on a face of one of the cambered walls opposite to the receiving room and has a predetermined area. When the drain pan is to be positioned to the circular margin of the hub, each cambered wall and the magnetic member contact the circular margin of the hub for adhesion.

Thereby, the drain pan for vehicle of the present invention can be easily positioned to the circular margin of the hub by magnetic force so as to prevent from being overturned. In addition, the magnetic member is able to fit to hubs in various sizes.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
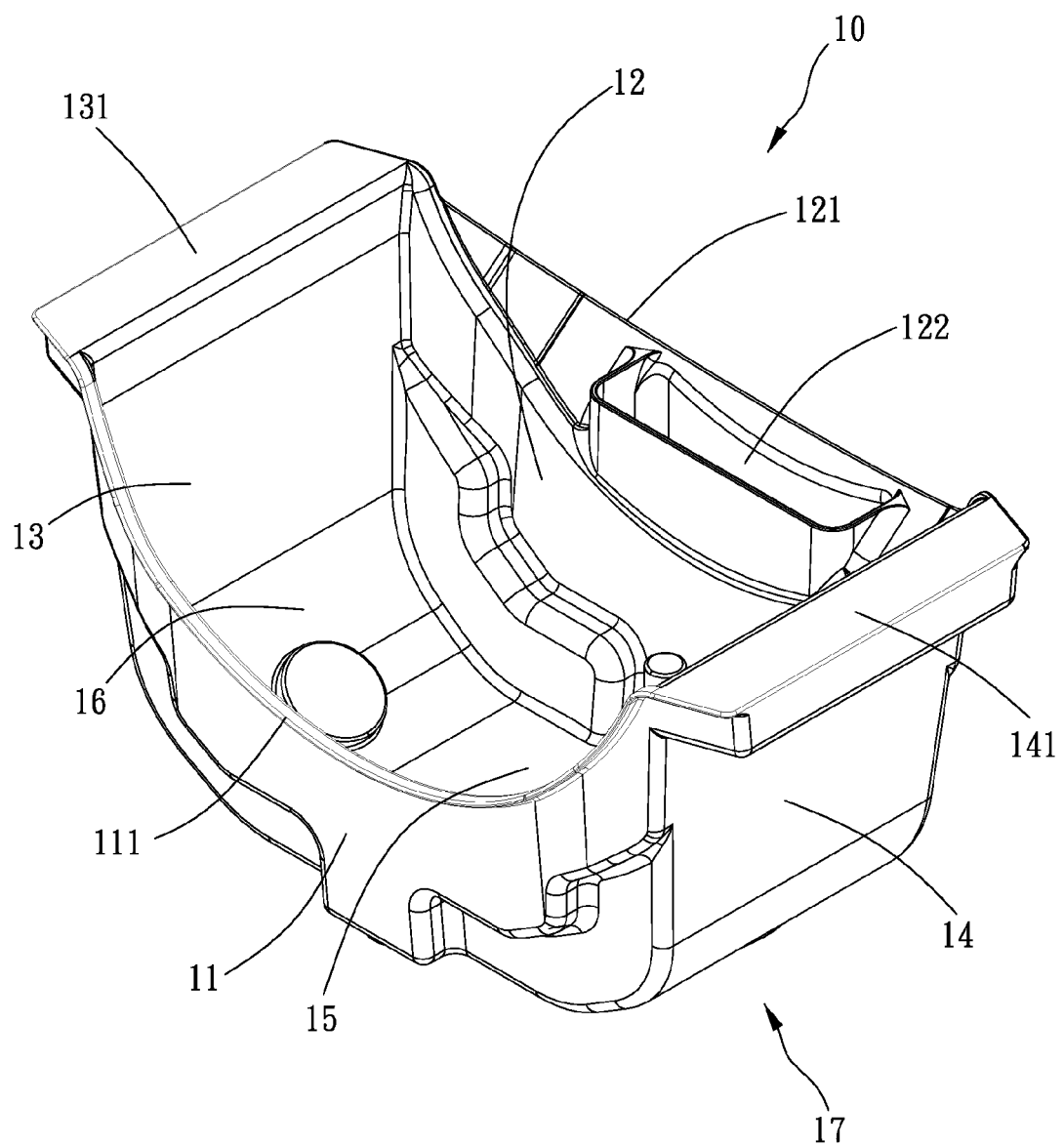
FIG. 1 is a stereogram showing a first embodiment of the present invention.
Figure 2:
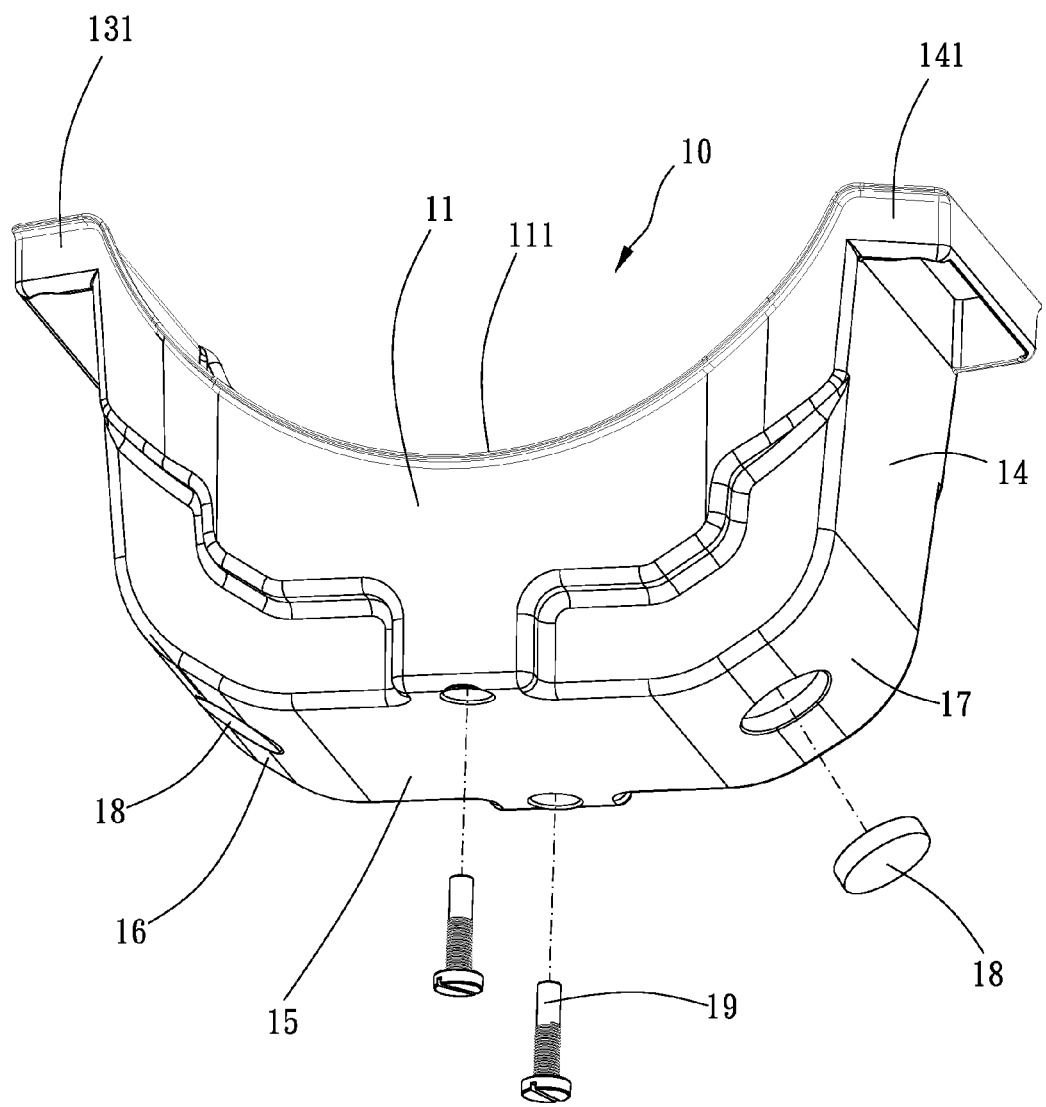
FIG. 2 is a stereogram at an other angle showing a first embodiment of the present invention.
Figure 3:
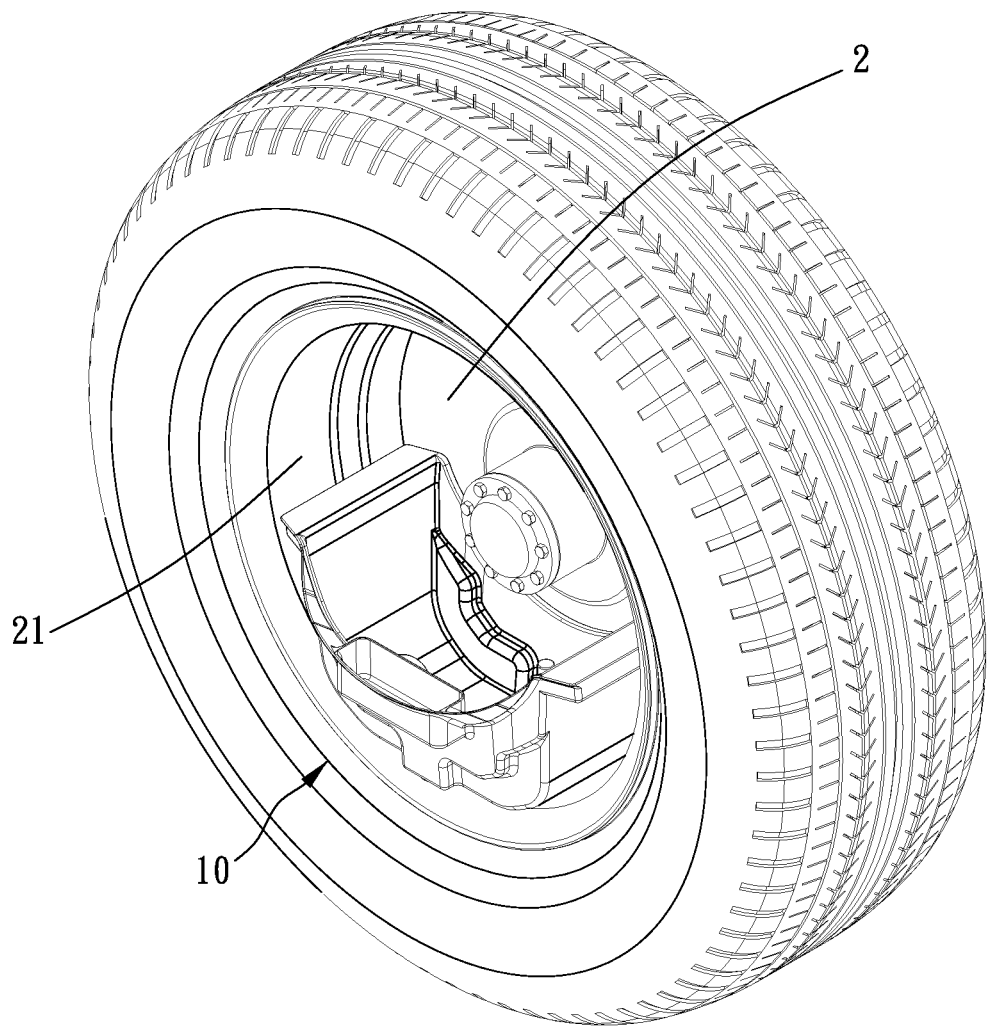
FIG. 3 is an illustration showing a first embodiment of the present invention.
Figure 4:
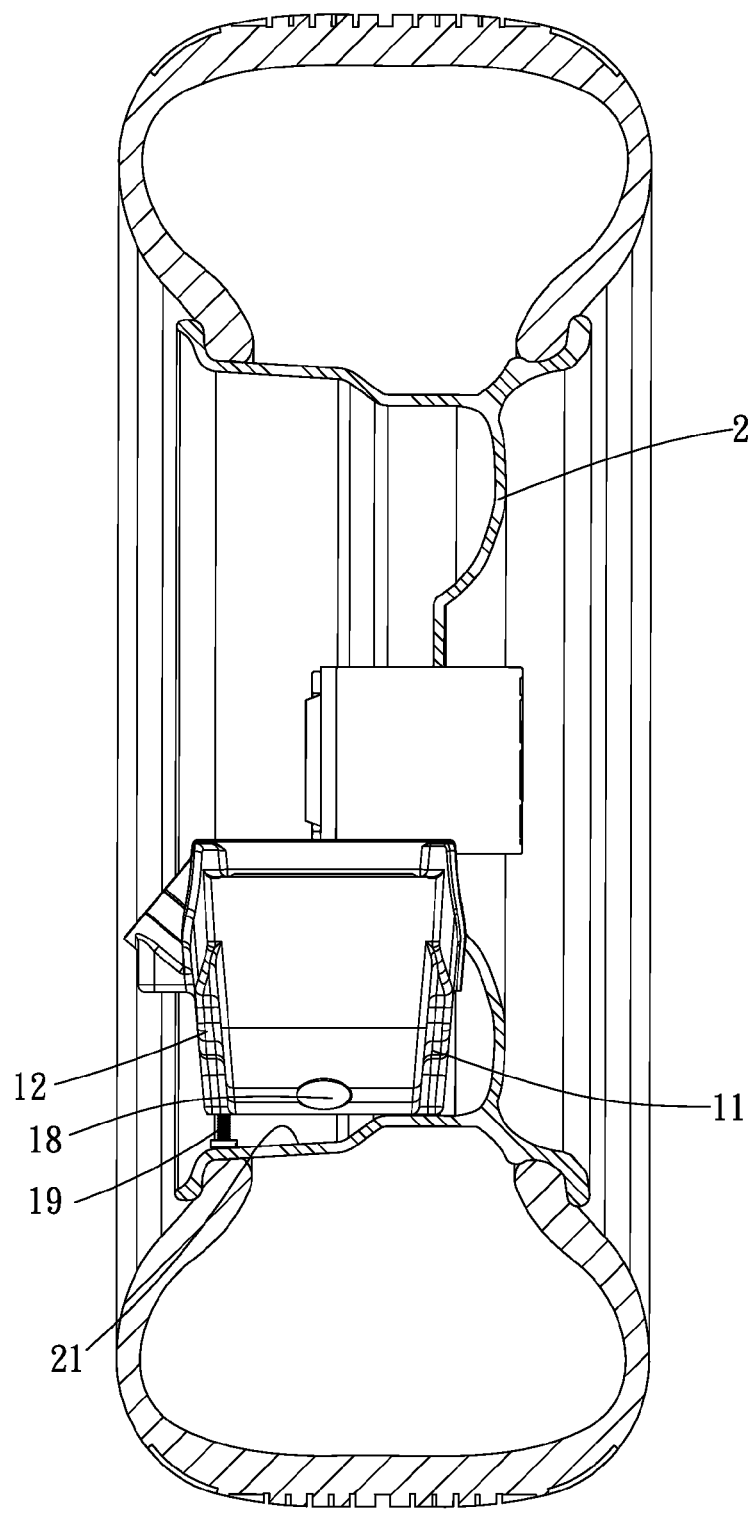
FIG. 4 is a profile of FIG. 3.
Figure 5:
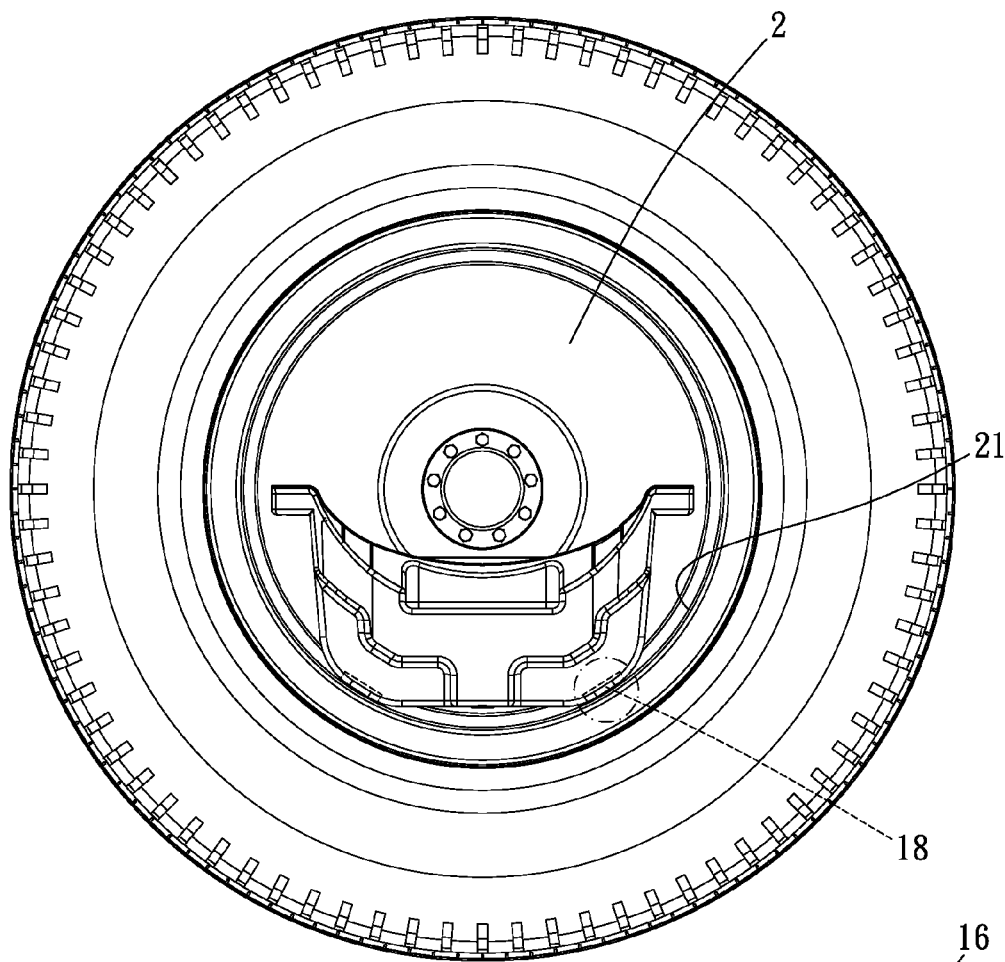
FIG. 5 is a front view of FIG. 3.
Figure 5A:
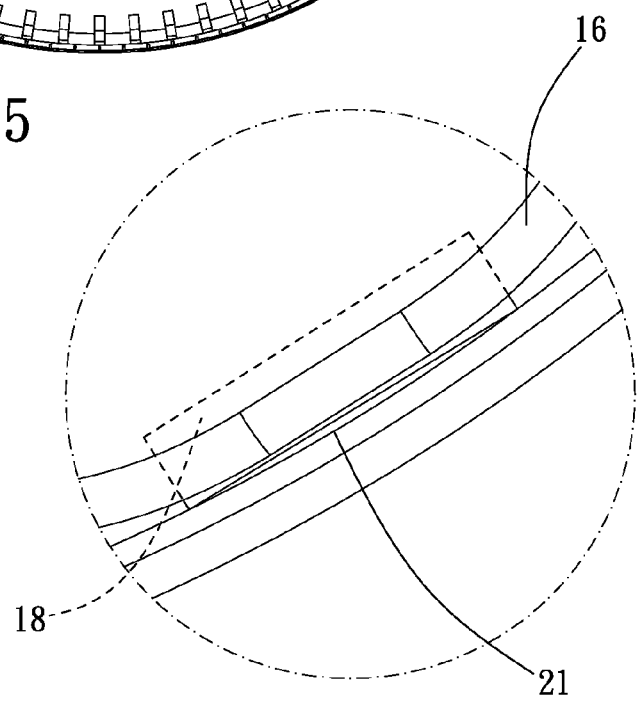
FIG. 5A is a partial enlargement of FIG. 5.

Please refer to FIG. 1 and FIG. 2 for a first embodiment of the present invention. The drain pan 10 for vehicle axle of the present invention adapted for being positioned to a circular margin of a hub includes a front wall 12, a rear wall 11, two lateral walls 13, 14, a bottom 15, two cambered walls 16, 17, and at least one magnetic member 18.

The front wall 12 has an upper margin 121 and a lower edge, and the rear wall 11 has an upper arc margin 111 and a lower edge. The upper arc margin 111 of the rear wall 11 has an intermediate portion lower than two ends of the upper arc margin 111 so that the upper arc margin 111 is recessed arc-shaped to correspond to a shape of the hub. Each lateral wall 13, 14 connects the front wall 12 and the rear wall 11 therebetween. The two lateral walls 13, 14 are arranged spacedly and face each other. The bottom 15 connects the lower edge of the front wall 12 and the lower edge of the rear wall 11 therebetween. A holding portion 131, 141 is formed from an upper margin of each lateral wall 13, 14 and extends away from the other lateral wall 14,13. Each cambered wall 16, 17 connects the bottom 15 and one of the lateral walls 13, 14 therebetween. A receiving room is enclosed and defined by the front wall 12, the rear wall 11, the two lateral walls 13, 14, the bottom 15, and the two cambered walls 16, 17. Each cambered wall 16, 17 is protruded away from the receiving room. The magnetic member 18 is disposed on a face of one of the cambered walls 16, 17 opposite to the receiving room and has a predetermined area. Preferably, two magnetic members 18 are disposed on faces of the two cambered walls 16, 17 opposite to the receiving room respectively. In the present embodiment, a storage cavity 122 is formed from a face of the front wall 12 facing the receiving room and extends toward the receiving room. The storage cavity 122 is adapted for storing tools and has a longitudinal direction parallel to the front wall 12. Besides, a lowest portion of the upper margin 121 of the front wall 12 is lower than a lowest portion of the upper arc margin 111 of the rear wall 11 so that the rear wall is higher than the front wall to prevent lubricant oil from leaking out. On the other hand, in the major embodiment of the present invention, a face of the bottom 15 opposite to the receiving room is disposed with a screwing element 19. A length of the screwing element 19 exposed out of the bottom 15 is able to be adjusted by rotating. Preferably, two screwing elements 19 are disposed on the bottom 15 and are located near the front wall 12 and the rear wall 11 respectively so that levelness of the bottom 15 can be adjusted by adjusting lengths of the two screwing elements 19.

In practice, please refer to FIGS. 3 to 5 and 5A. The drain pan 10 is placed on the circular margin 21 of the hub 2, and the two cambered walls 16, 17 contact the circular margin 21 so that the two magnetic members 18 can adhere onto the circular margin 21 for positioning. Also, the screwing elements 19 can abut against lower portions of the circular margin 21 to keep the drain pan 10 horizontal. Thereby, the drain pan 10 of the present invention is adapted for drained lubricant oil collection during process of lubricant oil replacing.

Figure 6:
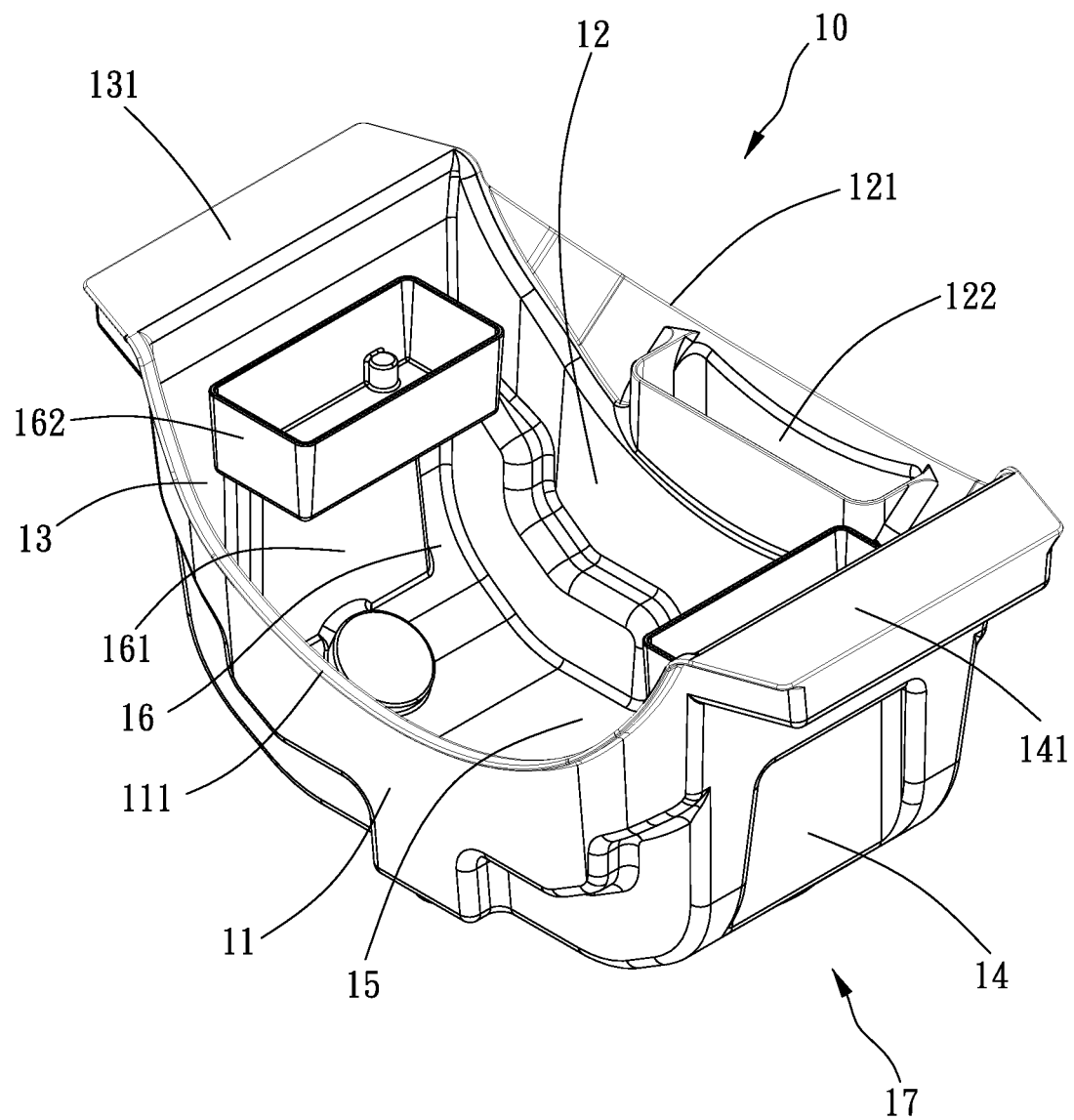
FIG. 6 is a stereogram showing a second embodiment of the present invention.
Figure 7:
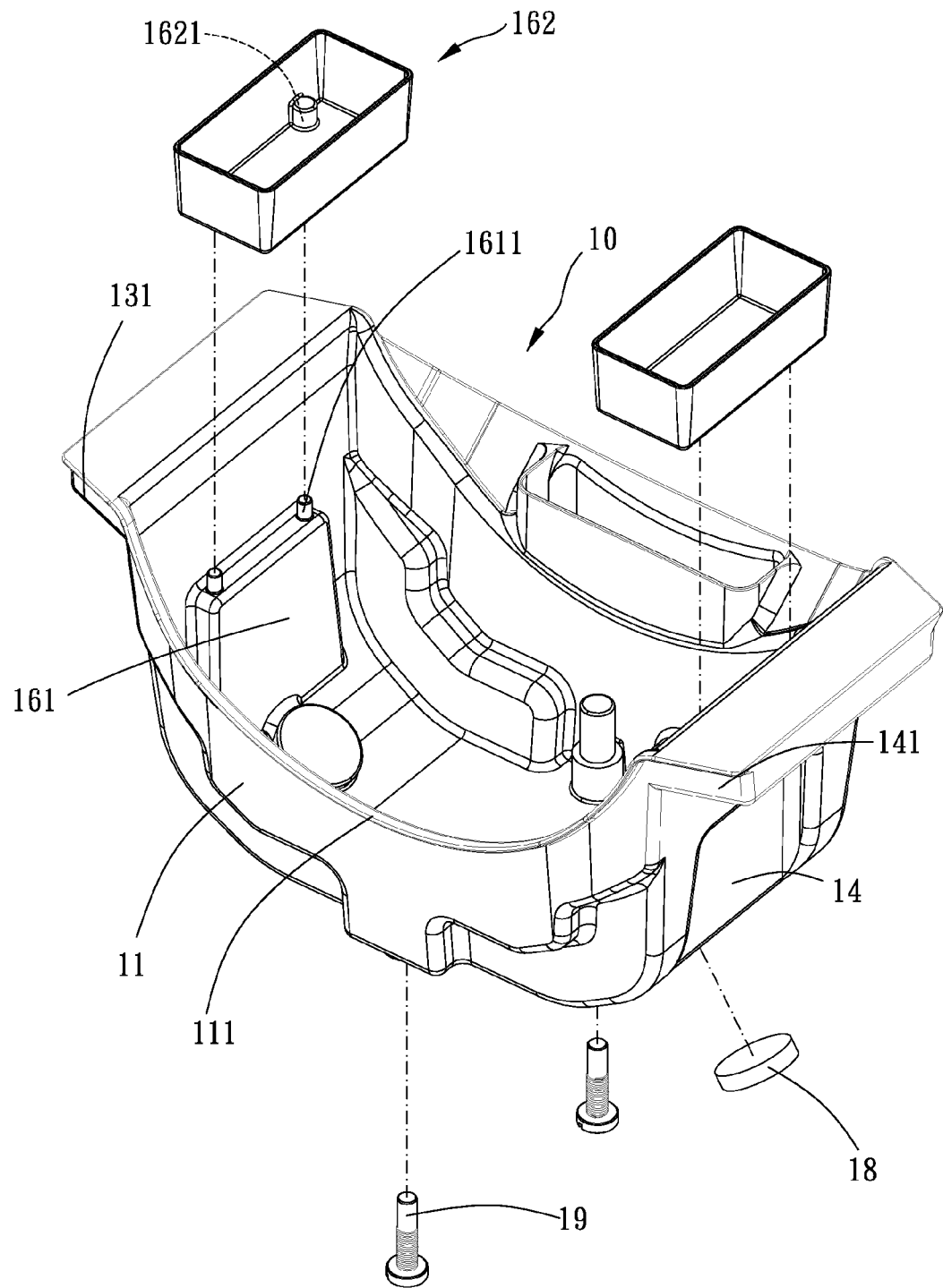
FIG. 7 is a breakdown drawing showing a second embodiment of the present invention.

In a second embodiment of the present invention, please refer to FIGS. 6 and 7, at least one storage case 162 is included. The storage case 162 is located in the receiving room and connects with one of the lateral walls 13. More particularly, a protruding bearing portion 161 is formed from one of the cambered walls 16 and extends upward along a direction parallel to the lateral walls 13. The bearing portion 161 has at least one protrusion 1611 formed on a top thereof, and the storage case 162 forms at least one positioning hole 1621 on a bottom thereof. The positioning hole 1621 has a shape corresponding to a shape of the protrusion 1611 so that the protrusion 1611 is able to be positioned into the positioning hole 1621. Thereby, the storage case 162 can be stably disposed on the bearing portion 161 adjacent to the lateral wall 13. However, the storage case can be positioned on the bearing portion by other possible means. Thus, the storage case is adapted for storing bolts or other tools to prevent them from being immersed in drained lubricant oil. In addition, the storage case is preferably detachable for being removed or being replaced.

Furthermore, the two cambered walls have contours corresponding to the circular margin of the hub, so the drain pan of the present invention can be utilized on hubs in various sizes. Besides, due to the magnetic member, a user can position the drain pan on the circular margin of the hub by simply placing the drain pan on the circular margin of the hub, and no other positioning element is needed. Also, after collection of lubricant oil, no positioning element needs to be removed in advance for removing the drain pan from the hub. Thus, leaking of lubricant oil is prevented because the drain pan may not be shaken during removing position element. Also, positioning elements missing or falling is prevented.

What is claimed is:

1. A drain pan for being positioned within a wheel hub under an axle, the drain pan comprising:
   a front wall having an upper flange and a front lower edge;
   a rear wall having an upper arcuate rim and a rear lower edge;
   two opposing lateral walls connecting the front wall to the rear wall, each lateral wall having an outwardly protruding upper handle;
   a cambered bottom wall connecting the front lower edge of the front wall to the rear lower edge of the rear wall, the cambered bottom wall having at least one magnetic member for attaching the drain pain to the wheel hub;
   an interior cavity defined by the front wall, the rear wall, the two lateral walls, and the cambered bottom wall; and
   an interior compartment attached to an inner surface of the front wall, the interior compartment having a sidewall substantially parallel to the front wall.

2. The drain pan for vehicle axle of claim 1, wherein the at least one magnetic member is two magnetic members disposed on an exterior surface of the cambered bottom wall.

3. The drain pan for vehicle axle of claim 1, the interior cavity further comprising at least one storage case attached to the lateral walls.

4. The drain pan for vehicle axle of claim 1, the cambered bottom wall further comprising at least one outer screwing element.

5. The drain pan for vehicle axle of claim 4, wherein the at least one outer screwing element is two screwing elements disposed near the front wall and the rear wall respectively.

\* \* \* \* \*